(12) United States Patent  
Wang et al.

(10) Patent No.: US 8,391,339 B2  
(45) Date of Patent: Mar. 5, 2013

(54) CORRELATOR SUM METHOD FOR SPREAD SPECTRUM SIGNAL RECEIVERS

(75) Inventors: Chi-Shin Wang, Half Moon Bay, CA (US); Jian Cheng, Guangzhou (CN); Zhike Jia, San Jose, CA (US); Shridhara A. Kudrethaya, Cupertino, CA (US)

(73) Assignee: CSR Technology Holdings Inc., Sunnyvale, CA (US)

( * ) Notice: Subject to any disclaimer, the term of this patent is extended or adjusted under 35 U.S.C. 154(b) by 1651 days.

(21) Appl. No.: 11/428,800

(22) Filed: Jul. 5, 2006

(65) Prior Publication Data

US 2009/0168851 A1    Jul. 2, 2009

(51) Int. Cl.  
*H04B 1/00* (2006.01)

(52) U.S. Cl. ........................................ 375/150
(58) Field of Classification Search .................... 375/150  
See application file for complete search history.

(56) References Cited

U.S. PATENT DOCUMENTS

| | | | |
|---|---|---|---|
| 5,418,538 A | 5/1995 | Lau | |
| 5,420,593 A | 5/1995 | Niles | |
| 5,594,453 A | 1/1997 | Rodal | |
| 5,629,708 A | 5/1997 | Rodal | |
| 5,893,044 A | 4/1999 | King | |
| 6,091,785 A * | 7/2000 | Lennen | 375/316 |
| 6,151,353 A * | 11/2000 | Harrison et al. | 375/136 |
| 6,473,452 B2 | 10/2002 | Whight et al. | |
| 6,496,533 B2 | 12/2002 | Lennen | |
| 6,704,348 B2 | 3/2004 | Abraham | |
| 6,724,807 B1 | 4/2004 | Krasner | |
| 6,724,811 B2 | 4/2004 | Kohli | |
| 6,735,243 B1 * | 5/2004 | Akopian | 375/150 |
| 6,891,880 B2 | 5/2005 | Abraham | |
| 6,931,056 B2 | 8/2005 | Goodings | |
| 7,010,066 B2 | 3/2006 | Sullivan | |
| 2002/0146065 A1 * | 10/2002 | Kohli et al. | 375/150 |
| 2007/0002937 A1 * | 1/2007 | Min et al. | 375/150 |

* cited by examiner

*Primary Examiner* — David C. Payne  
*Assistant Examiner* — Tanmay Shah  
(74) *Attorney, Agent, or Firm* — Pillsbury Winthrop Shaw Pittman LLP

(57) ABSTRACT

The present invention provides systems and methods for faster acquisition and more stable tracking of spread spectrum signals with lower computational load requirements. Instead of the present day practice of using only the Prompt correlator, the systems and methods of the invention use the sum of the powers of all the correlators of a channel to determine the acquisition or tracking of the signal. These systems and methods improve the signal acquisition speed resulting in a reduced Time-To-First-Fix (TTFF). Further, these systems and methods improve the acquisition and tracking sensitivity of the receiver.

35 Claims, 5 Drawing Sheets

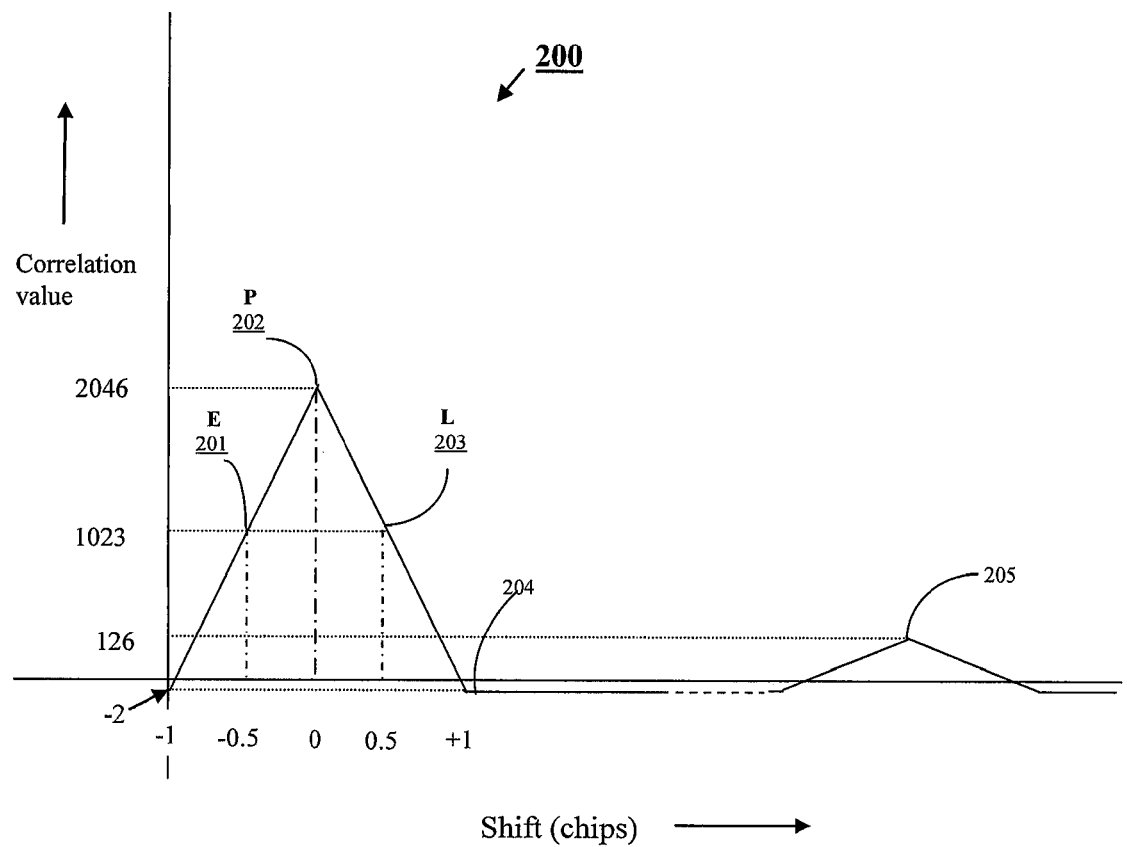
FIG. 2 GPS PN Sequence Correlation

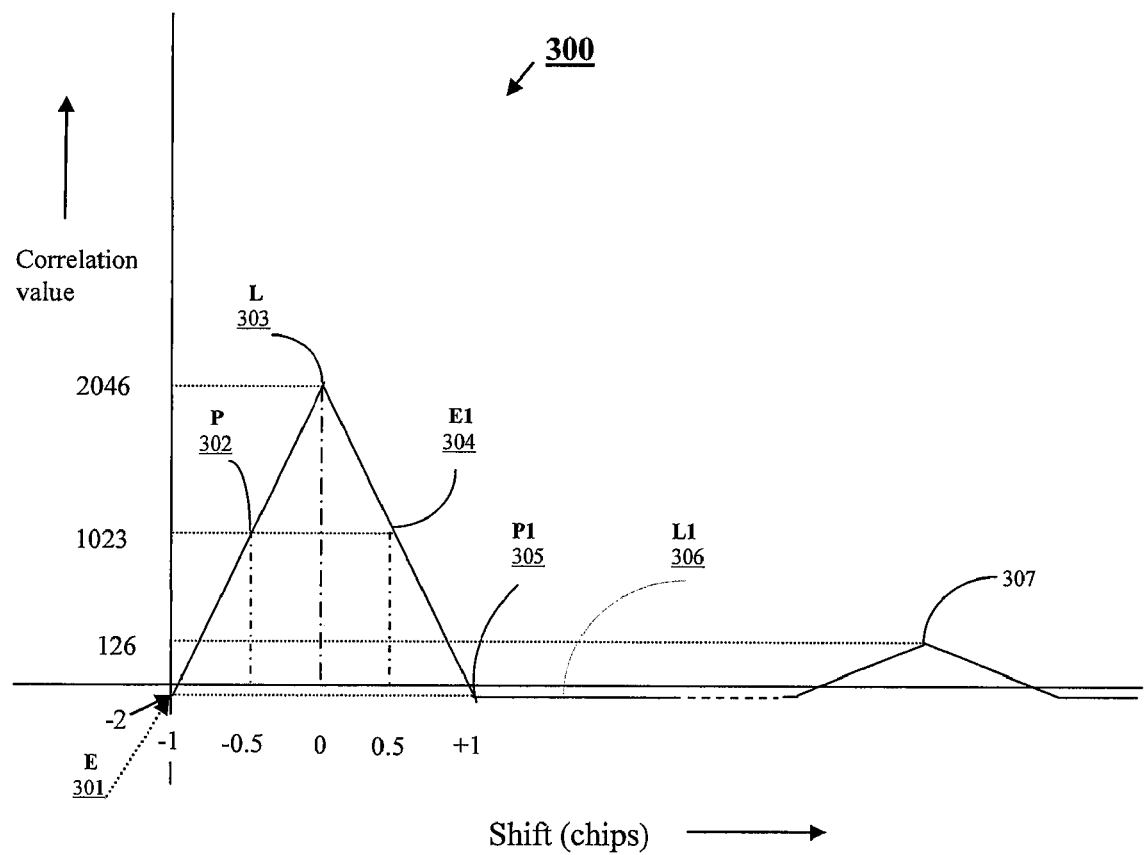
FIG. 3 GPS PN Sequence Correlation with peak at L correlator

CORRELATOR SUM METHOD FOR SPREAD SPECTRUM SIGNAL RECEIVERS

FIELD OF THE INVENTION

The present invention relates generally to spread spectrum signal receivers, and more particularly to fast acquisition and stable tracking of spread spectrum or navigational signals using Correlator Sum methods.

BACKGROUND OF THE INVENTION

The global positioning system (GPS) is a satellite-based radio-navigation system built and operated by the United States Department of Defense. The system uses twenty-four satellites orbiting the earth at an altitude of about 11,000 miles with a period of about twelve hours. More than twenty-four satellites may be present as spares. These satellites are placed in six different orbits such that at any time a minimum of six satellites are visible at any location on the surface of the earth except in the polar region. Each satellite transmits a time and position signal referenced to an atomic clock. A typical GPS receiver locks on to this signal and extracts the data contained in it. Using signals from a sufficient number of satellites, a GPS receiver can calculate its position, velocity, altitude, and time.

A GPS receiver can acquire signals in many modes. In a "hot start" mode, the receiver already has the time, its last position, and the information on satellite position (also known in the art as almanacs or ephemeris) stored in its memory. The receiver can use this stored information to determine which satellites are probably visible, and it can then lock onto those satellite signals in a short time. On the other hand, the receiver may have no prior data on its position, time, or almanacs stored in memory. In this "cold start" mode, the receiver has to search for signals from all of the satellites present in the constellation. There are some other modes where partial information on time, position and almanacs are available and the corresponding start mode is known as "warm start."

A GPS receiver has to acquire and lock onto at least four satellites in order to derive the position, velocity and time. Usually, a GPS receiver has many parallel channels, each receiving signals from a separate visible GPS satellite. The acquisition of the satellite signals involves a two-dimensional search of carrier frequency and the pseudorandom noise (PRN) code phase. Each satellite transmits a unique PRN code, which repeats every millisecond. The receiver locally generates a replica frequency and a replica code phase and correlates these with the received satellite signals. The PRN code has to be searched in at least 2046 phases and the frequency search depends upon the Doppler frequency due to relative motion between the satellite and the receiver. Additional frequency variation may result due to local oscillator instability.

The above two-dimensional search for the correct code phase and carrier frequency requires a lot of computational power and time. Many techniques are being developed to reduce this acquisition time. In the case of GPS receivers, these techniques improve the Time-To-First-Fix (TTFF) resulting in fast position estimation. There are U.S. patents disclosing methods of improving the acquisition time of a spread spectrum signal receiver with primary focus on GPS signal receivers. For example, U.S. Pat. No. 5,418,538 uses reference stations to aid in signal acquisition. U.S. Pat. Nos. 5,594,453 and 5,629,708 achieve rapid signal acquisition by compensating for the drift in the local frequency oscillator and thus reducing the frequency search range. U.S. Pat. Nos. 5,420,593, and 6,091,785 and published U.S. patent application 20020027949 store input samples and the subsequent correlation is done faster than the real time. U.S. Pat. No. 5,893,044 discloses using a high precision clock to reduce the frequency uncertainty. U.S. Pat. No. 6,704,348 does correlation at multiple resolutions. The use of matched filter for fast acquisition is disclosed in the U.S. Pat. No. 6,724,807, while a similar parallel correlation technique is the fast acquisition method disclosed in the U.S. Pat. No. 6,724,811. U.S. Pat. No. 6,735,243 uses a sectioned correlator for the same purpose. U.S. Pat. No. 6,891,880 employs the vector multiplication concept. Published U.S. patent application 20010003821 uses a method of continuous summation which results in enhanced code phase correlation when there is no precise carrier phase lock. Published U.S. patent application 20020025011 uses Fast Fourier Transform (FFT) and inverse FFT to achieve a better acquisition time. The use of early-minus-late correlators as disclosed in U.S. patent application 20010055330 also speeds up acquisition. However, all of these methods require increased hardware or computational load or memory.

SUMMARY

Accordingly, the present invention provides systems and methods for faster acquisition and more stable tracking of spread spectrum signals with lower computational load requirements. Instead of the present day practice of using only the Prompt correlator, the systems and methods of the invention use the sum of the powers of all the correlators of a channel to determine the acquisition or tracking of the signal. These systems and methods improve the signal acquisition speed resulting in a reduced Time-To-First-Fix (TTFF). Further, these systems and methods improve the acquisition and tracking sensitivity of the receiver.

The above and other advantages of embodiments of this invention will be apparent from the following more detailed description when taken in conjunction with the accompanying drawings.

BRIEF DESCRIPTION OF THE DRAWINGS

FIG. 2 is an illustration of the PN sequence correlation characteristics.

FIG. 3 shows the GPS PN sequence correlation with a peak occurring at the L correlator.

DETAILED DESCRIPTION

Figure 1A:
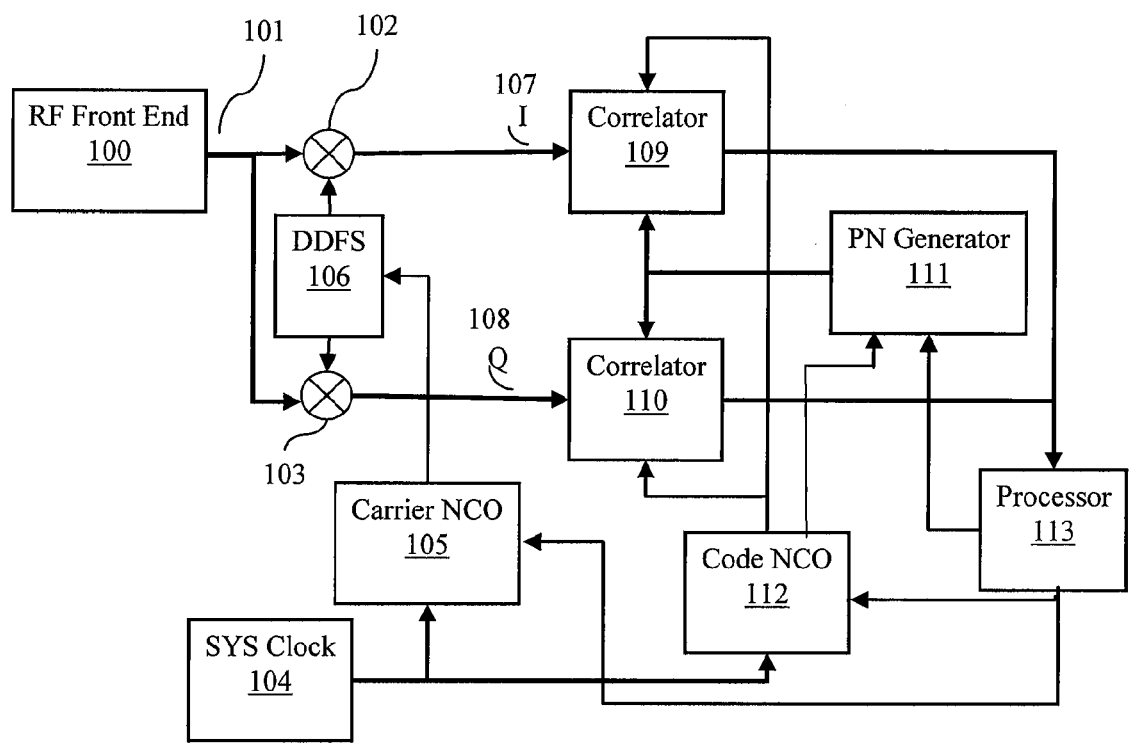
FIG. 1A is a block diagram illustrating a GPS receiver according to an embodiment of the invention.

FIG. 1A illustrates a receiver according to a preferred embodiment of the invention. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase component I 107. In a parallel path the same signal 101 is multiplied by the DDFS frequency in quadrature (i.e., with a phase shift of 90 degrees) to produce quadrature component Q 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of the ADC output 101. Thus the I and Q signals produced by the IF mixers 102 and 103 are at near zero carrier frequency after being low-pass filtered to remove the high frequency components which are at twice the IF frequency band.

The I and Q components 107 and 108 are correlated in correlators 109 and 110, respectively, with a locally-generated PRN sequence generated by a PRN generator 111. The PRN-sequence corresponds to the satellite whose signal is being processed by the baseband section at that time. The PRN sequence generator is driven by code NCO 112. The local code frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator outputs are then sent to processor 113 at every millisecond interval. The processor 113 is preferably a digital signal processor (DSP) core suitable for high speed arithmetic computations. Subsequent processing of the signals take place in the processor 113, as will be described in detail below. Additional details of the receiver baseband section described above are contained in U.S. patent application Ser. No. 11/123,861 filed on May 6, 2005, the specification of which is incorporated herein by reference.

The processor 113 receives one millisecond integrated (correlated) I and Q values from the GPS baseband section described above. In order to acquire a GPS signal in the processor 113, all dwells (set of carrier frequency, code offset) are searched. This is a two-dimensional search. Coherent integration and non-coherent integration are two commonly used integration methods to acquire GPS signals. Coherent integration provides better signal gain at the cost of larger computational load, for equal integration intervals.

The power associated with non-coherent integration of N one-millisecond correlation results is $$\text{Power} = \sum_{n=0}^{N-1} (I(n)^2 + Q(n)^2) \quad (1)$$

and the power associated with coherent integration is $$\text{Power} = \left(\sum_{n=0}^{N-1} I(n)\right)^2 + \left(\sum_{n=0}^{N-1} Q(n)\right)^2 \quad (2)$$

where I(n) and Q(n) denote the one-millisecond correlation values from the baseband section at interval n, and N denotes the desired number of one-millisecond integration intervals. For coherent integration, the valid frequency bandwidth is narrowed so the frequency step is smaller than in non-coherent integration, which means that there are more frequency bins to search when using coherent integration. One method to mitigate this impact is to use an FFT method for coherent integration so that more frequency bins can be checked at a time. However, one additional parameter (i.e., bit edge) needs to be detected, especially for coherent integration over extended periods of time. Thus, when used as it is, this FFT based method results in increased computational load. A multi-step acquisition scheme consisting of coarse acquisition and fine acquisition may be employed to reduce the computational load.

Figure 1B:
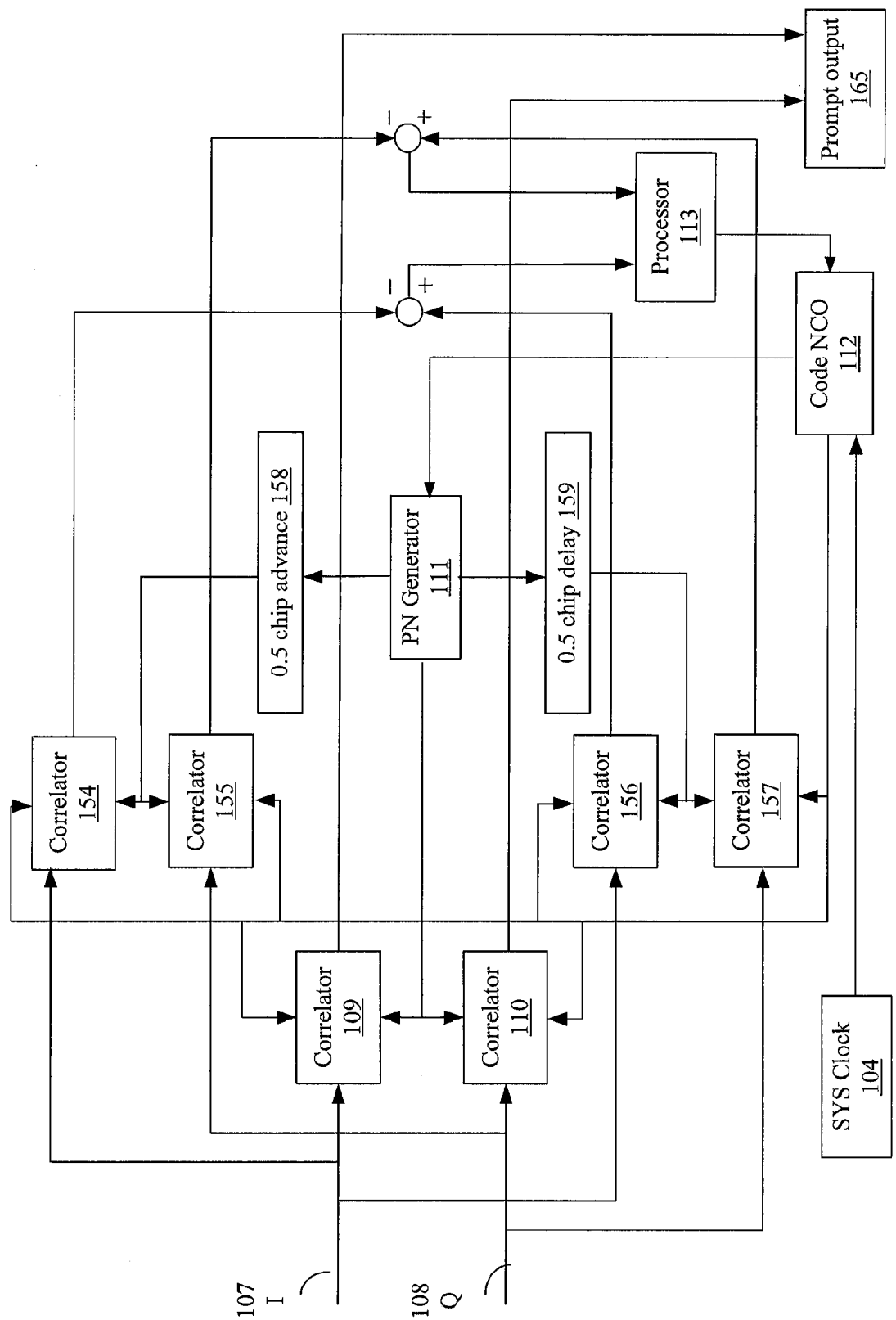
FIG. 1B is a block diagram illustrating an example of a GPS receiver comprising Prompt, Early and Late correlators.

Each channel of a GPS receiver usually contains at least three correlators placed half chip apart. These are known as Early (E), Prompt (P) and Late (L) correlators. FIG. 1B illustrates an example of a GPS receiver with Early (E), Prompt (P) and Late (L) correlators. The I and Q component signals 107 (I) and 108 (Q) of FIG. 1 are inputted to the Early (E), Prompt (P) and Late (L) correlators. The I and Q correlators 109 and 110 of FIG. 1 are the Prompt (P) correlators. The I and Q correlators 154 and 155 are the Early (E) correlators and the I and Q correlators 156 and 157 are the late (L) correlators. The reference local PN sequence is advanced by 0.5 chip in the case of the E correlators 154 and 155 as shown in block 158. Similarly, the local PN sequence is delayed by 0.5 chip in the case of the L correlators 156 and 157 as shown in block 159. The difference of the outputs of the E correlators 154 and 155 and L correlators 156 and 157 are inputted to the processor 113.

FIG. 2 illustrates auto-correlation as a function of the code phase shift. Under a zero code phase shift condition, perfect correlation occurs. Under this condition, reference 202 represents the correlation value of the P correlator while references 201 and 203 represent correlation values of the E and L correlators, respectively. It is possible to have more than three correlators per channel in order to further improve acquisition time. The relative output of the P correlator usually gives an indication of perfect correlation. Under perfect correlation in the absence of any interference or noise, the P correlation value is 2046 when a sampling rate of two samples per chip is assumed. Under this condition both the E and L correlators have a correlation value of 1023. The correlation values associated with other code phases are either −130, +126 (each about 12.5% of time) or −2 (about 75% of the time). Reference 204 illustrates the case of a correlation value equal to −2 while reference 205 is a typical secondary positive correlation peak of value +126. Under this condition, it is clear that the correct peak correlation can be easily determined. This determination can be done by shifting the code phase at half chip interval until the maximum correlation phase occurs. Alternatively, this determination can be done through the sum of E, P and L correlation values. In the ideal case discussed above this sum of the correlation values is 2046+1023+1023=4092. This value is far greater than the sums of correlation values at other code phases in which the sum value has a maximum limit of 126+63+63=252 (or −260). This shows that instead of searching for maximum correlation at every sample position (i.e., every 0.5 chip in this example), a sum of correlation values pertaining to a group of consecutive samples may first be obtained and searching can be done using a search step equal to a distance of the number of samples per group. Once the group containing the phase with maximum correlation has been found in this way the desired code phase may be determined in the next step. Thus the number of code phases that need to be examined is reduced. The reduction ratio is approximately equal to the number of samples in a group. The code phase search is the most computationally intensive operation in a spread spectrum receiver and the reduction in the number of code phases examined represents a large reduction in the required computational load and thus improves the Time-To-First-Fix (TTFF) of the receiver.

On the other hand if the maximum correlation occurs at E or L instead of P, the correlation value of P will be half of the maximum value i.e. 1023 while the correlation value of E or L has a value of 2046. This case is illustrated in FIG. 3 where reference 300 is the correlation with a peak at the L correlator. In this figure, E has a value of −2 and is shown as 301. P on the other hand has a value of 1023 shown as 302. L shown as 303 has the highest value of 2046. The correlation values of the next group are also shown. In this group, E1 has a correlation value of 1023 shown as 304 while both P1 and L1 have a correlation value of −2 shown as 305 and 306. When E has a value of 2046, the P will have a value of 1023 and the L value will be −2 or −130 or 126. Even in these cases the sum of the three correlators still points to the correct group of samples. In the example of FIG. 3, the group containing E, L, and P is the correct group.

For the example of a receiver comprising Prompt, Early and Late correlators, the correlation values outputted from the P, E and L correlators can be used to form groups of three consecutive 0.5 chip samples with a distance of 1.5 chips per group. In a first stage, the group containing the phase with maximum correlation is searched for at a search step of 1.5 chips per group. For each group, the sum of the correlation values of the group is examined. In this example, the group containing the phase with maximum correlation is the group with the maximum correlation sum. Once the group containing the phase with maximum correlation is determined, the desired code phase may be determined in the next step. This may be done by finding the largest correlation value within the group and setting the phase code as the phase position corresponding to the largest correlation value. In the example in FIG. 3, the group containing the phase with maximum correlation is the group containing E, P and L, and the correct phase code corresponds to the phase position of L.

Figure 4:
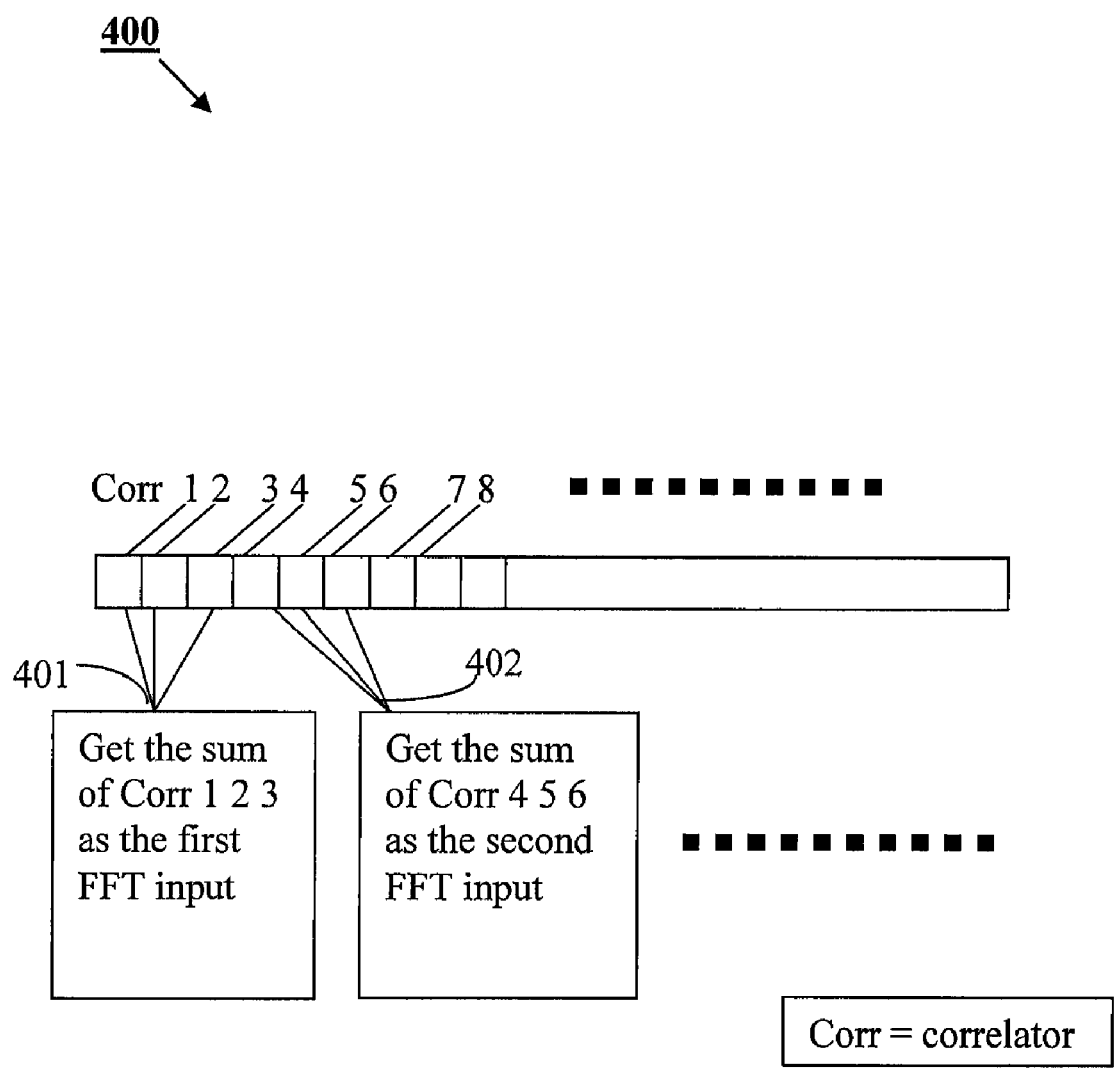
FIG. 4 illustrates the grouping of the correlators according to an embodiment of the invention.

The previous discussion pertains to the case of zero residual carrier frequency. When there is a residual carrier frequency, a Fast Fourier Transform (FFT) of the sum samples may be computed to determine that frequency. The maximum FFT component is the residual frequency. A possible grouping with three adjacent correlators is illustrated as 400 in FIG. 4. Embodiments with more than three correlators can also be considered. In the block 400, the block 401 is the group of correlator outputs 1, 2 and 3. The sum of these three correlator outputs is the first input to the FFT. Similarly, block 402 represents the group of correlator outputs 4, 5 and 6 and the sum of these three correlator outputs is the second input to the FFT, and so forth. Thereafter, an FFT of these sum values is computed and the associated residual carrier frequency is determined by the maximum FFT component.

For the example of a receiver comprising Prompt, Early, and Late correlators, the correlation values outputted from the P, E and L correlators can be grouped into groups with each group containing three adjacent correlation values spaced 0.5 chips apart. The sum of the correlation values of each group is then inputted to the FFT with the carrier frequency determined by the resulting maximum FFT component. In this example, a first group of adjacent correlation values outputted from the P, E and L correlators would correspond to correlator outputs 1, 2 and 3 of group 401, a second group of adjacent correlation values outputted from the P, E and L correlators would correspond to correlator outputs 4, 5 and 6 of group 402, and so forth.

In this disclosure, we use samples per chip or correlators per chip interchangeably and convey the same meaning.

An analysis of the possible improvement in signal to noise gain is given by the following. The analysis uses two correlators per chip. That is, the space between two adjacent correlators is half chip. Therefore, the amplitude of the Early or Late correlator is half that of the Prompt correlator. If we use three correlators to form one group, there are two possible cases.

Case 1: Early, Prompt and Late correlators are in this group. The signal power of this group is given by $$S_{sum} = \left(\frac{1}{2}I_s + I_s + \frac{1}{2}I_s\right)^2 + \left(\frac{1}{2}Q_s + Q_s + \frac{1}{2}Q_s\right)^2 = 4(I_s^2 + Q_s^2) \quad (3)$$

where the signal portion in the output of Prompt correlator is $I_s + jQ_s$, ($I_s$ is in-phase signal and $Q_s$ is quadrature signal) while the signal portion of the output of the Early or Late correlator is $$\frac{1}{2}I_s + j\frac{1}{2}Q_s.$$

The signal power of Prompt correlator is given by $$S_p = I_s^2 + Q_s^2 \quad (4)$$

The noise power in an n-correlator group is given by $$N_{sum} = nN_p = n\sigma^2 \quad (5)$$

where n is the number of correlators in a group and $\sigma^2$ is the noise power of each correlator output.

Based on equations 3, 4 and 5, we can get the Signal-to-Noise Ratio (SNR) gain as $$\text{Gain} = SNR_{sum} - SNR_p = \quad (6)$$
$$10\lg\frac{S_{sum}}{N_{sum}} - 10\lg\frac{S_p}{N_p} = 10\lg\left(\frac{S_{SUM}}{S_p}\frac{N_P}{N_{SUM}}\right) = 10\lg\frac{4}{3} \approx 1.25 \text{ dB}$$

Case 2: Early and Prompt or Prompt and Late correlators are in this group, the remaining correlator only outputs noise. The signal power of this group is given by $$S_{sum} = \left(\frac{1}{2}I_s + I_s\right)^2 + \left(\frac{1}{2}Q_s + Q_s\right)^2 = 2.25(I_s^2 + Q_s^2) \quad (7)$$

Based on equations 4, 5 and 7, we can get the gain in Signal-to-Noise Ratio (SNR) as $$\text{Gain} = SNR_{sum} - SNR_p = 10\lg\frac{S_{sum}}{N_{sum}} - 10\lg\frac{S_p}{N_p} = \quad (8)$$
$$10\lg\left(\frac{S_{SUM}}{S_p}\frac{N_P}{N_{SUM}}\right) = 10\lg\frac{2.25}{3} \approx -1.25 \text{ dB}$$

From Equations 6 and 8, it can be seen that compared with the traditional single correlator solution, there is a ±1.25 dB signal to noise ratio gain by the Correlator Sum algorithm, which depends on whether Early, Prompt and Late correlators are all in the group. The sensitivity improvement may decrease with the number of correlators considered if the additional correlators are outside the two chip correlation triangle interval because correlators outside the triangle interval contain noise, not signal, and the noise will decrease the SNR. An example of the correlation triangle is shown in FIG. 2. On the other hand, if these additional samples are within the same chip, then the sensitivity improves. This is because the correlators are within the correlation triangle interval where the correlation values which carry signal energy are higher than the noise level. Thus in the later case, if sufficient number of samples are within the correlation triangle, then the sensitivity can be improved by considering a greater number of samples. For weak signal acquisition and tracking, we to need make sure that Early, Prompt and Late correlators are all in the group to keep the 1.25 dB SNR gain. The required method is to adopt some samples overlapped to form a group. Under overlapping conditions, the code phase search step is smaller than the correlator or sample group size. For example, correlator outputs 1, 2 and 3 form the first group, correlator output 2, 3 and 4 forms the second group and so on. In this case, the code phase search step is only equal to one correlator spacing. Clearly, it is at the cost of no computation reduction.

Further, the greater the number of samples in a group, the greater the computation load reduction. The number of samples within the correlation triangle represents the number of samples per two chip duration. It is also possible to change the search step by employing software based correlators unlike the hardware correlators which have fixed step size. To illustrate, a typical hardware may have three correlators per channel and even if the sampling rate is increased, the hardware correlators provide no additional advantage. On the other hand, the number of software correlators per channel may be increased to accommodate the increased sampling rate. This means the step size in software correlation can be made 1/n of a chip where n may be equal to 2 or 3 or 4 or any suitable integer value while in the case of hardware correlator set it has to be fixed unless a larger number of correlators per channel are available.

The residual frequency associated with the samples is wiped off in the first stage and therefore no further FFT computation is needed in the subsequent stages. This is because the residual frequency is low and is common for all group sizes.

This correlator sum technique may be implemented in several stages instead of only two. Under such cases, only the groups exhibiting powers above a given threshold are considered. These groups are then divided into smaller groups to arrive at the next group size. This process is continued until each group contains only one correlator.

As already explained, in the correlator sum approach, the actual correlation is done in two or more stages. In the first stage, the group with maximum correlation sum is determined. In the last stage, the actual correlator where the maximum correlation occurs is determined. If there is a multipath signal component, it is transparent to the first stage as the multipath is present between the correlators within the group. This multipath error is estimated in the final stage.

A long time integration is needed for weak signal tracking. Under this condition the PRN sequence length will have an integer number of groups. In case an integer number of groups are not possible, an overlap of samples may occur in the last two groups. The respective group powers are added together in this long integration. This long integration helps in easily identifying the peak. But during the integration time, signal peak might shift from one correlator to others because of the code phase offset change or possible multipath effect. Depending upon the possible peak correlation shift, the group size must be adjusted and the longer the integration time, the larger the group size needed. Thus, if we only take one correlator into consideration, we might lose signal tracking. However, if the signal is still within that correlator group, we can keep tracking using the Correlator Sum algorithm.

When the satellite is locked and in fine tracking status, the correlator sum method also can be used for data bit decoding. In this stage, we have the knowledge of which correlator is the Prompt correlator. Therefore, we can put the Early, Prompt and Late correlators in one group to boost signal to noise ratio gain by about 1.25 dB. This is possible because when the sign of the sum of the group changes and remains so for approximately 20 milliseconds or multiples of that time interval, the data bit sign change can be detected. This time is approximate when the group size is large and a better resolution is obtained as one proceeds to stages with smaller groups. For example, if the group size is three, then the data bit edge may occur in any adjacent chips containing 201 or 203 of FIG. 2. But when the group size is decreased to one, the correct data bit edge is identified as in the case of normal signal tracking without summing.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems and also to any type direct sequence spread spectrum receivers. Accordingly, it is intended that the appended claims be interpreted as covering all alterations and modifications as fall within the spirit and scope of the invention.

What is claimed is:

1. A method for acquiring a spread spectrum signal in a receiver, comprising:
   correlating samples of the spread-spectrum signal using groups of two or more adjacent correlators, wherein the adjacent correlators in each group respectively correlate a same respective sample of the spread-spectrum signal with a same code but shifted in time with respect to other correlators in that group such that correlation values obtained from the adjacent correlators are spaced apart by a fraction of a time interval with respect to the same respective sample of the spread-spectrum signal;
   obtaining a sum of correlation values for each of the groups of two or more adjacent correlators;
   reducing a number of code phases to be examined by searching for a maximum correlation sum among the sum of correlation values for each group instead of searching for maximum correlation values at every correlator output; and
   acquiring the spread-spectrum signal in accordance with results of the search.

2. The method of claim 1, wherein the correlation values obtained from adjacent correlators are spaced 0.5 chip apart.

3. The method of claim 1, further comprising:
   inputting the total power output of the group into a frequency domain transform; and
   determining a carrier frequency of the signal based on a maximum component of the frequency domain transform.

4. The method of claim 1, further comprising:
   summing the respective total power outputs of a plurality of groups of adjacent correlators over several pseudo random noise (PRN) sequence lengths; and using the sum of the total power outputs to acquire the signal.

5. The method of claim 1, wherein the number of correlators in the group depends upon required reduction in computational load.

6. The method of claim 1, wherein the number of correlators in the group depends upon a required improvement in sensitivity.

7. The method of claim 1, wherein the number of correlators in the group depends upon input signal samples per chip.

8. The method of claim 4, wherein frequency domain transform is used only in a first stage.

9. A method for acquiring a spread spectrum signal in a receiver, comprising:
correlating samples of the spread-spectrum signal using groups of two or more adjacent correlators, wherein the adjacent correlators in each group respectively correlate a same respective sample of the spread-spectrum signal with a same code but correlation values obtained from the adjacent correlators are spaced apart by a fraction of a time interval with respect to the same respective sample of the spread-spectrum signal, wherein determining a code phase of the signal comprises:
grouping adjacent correlator power outputs into groups;
searching for groups having a power output above a threshold using a first code phase search step;
after finding the groups having a power output above the threshold, dividing these groups into smaller groups; and
searching for the code phase from among the smaller groups using a second code phase search step that is smaller than the first code phase search step.

10. The method of claim 9, wherein a correlation value obtained from each of the adjacent correlators is 1 ms.

11. The method of claim 10, wherein a multipath error estimation and correction is made in a final stage.

12. The method of claim 9, wherein hardware and software embodiments employ different code phase search steps during acquisition.

13. A method for tracking a spread spectrum signal in a receiver, comprising:
correlating samples of the spread-spectrum signal using groups of two or more adjacent correlators, wherein the adjacent correlators in each group respectively correlate a same respective sample of the spread-spectrum signal with a same code but shifted in time with respect to other correlators in that group such that correlation values obtained from the adjacent correlators are spaced apart by a fraction of a time interval with respect to the same respective sample of the spread-spectrum signal;
obtaining a sum of correlation values for each of the groups of two or more adjacent correlators;
reducing a number of code phases to be examined by searching for a maximum correlation sum among the sum of correlation values for each group instead of searching for maximum correlation values at every correlator output; and
tracking the spread-spectrum signal in accordance with results of the search.

14. The method of claim 13, wherein the correlation values obtained from adjacent correlators are spaced apart by 0.5 chip.

15. The method of claim 13, further comprising:
inputting the total power output of the adjacent correlators into a frequency domain transform; and
determining carrier frequency of the signal based on a maximum component of the frequency domain transform.

16. The method of claim 13, wherein the number of correlators depends upon required reduction in computational load.

17. The method of claim 13, wherein the number of correlators depends upon a required improvement in sensitivity.

18. The method of claim 13, wherein the number of correlators depends upon input signal samples per chip.

19. The method of claim 13: wherein the number of correlators depends upon an integration length.

20. The method of claim 15, wherein the frequency domain transform is used only in a first stage.

21. The method of claim 13, wherein a step for a search for a phase of the code is set larger during an initial acquisition stage than a later stage.

22. The method of claim 13, wherein data bit decoding is based on correlation values from all the correlators forming a group.

23. The method of claim 22, wherein Early, Prompt and Late correlators are chosen to form the group.

24. A spread spectrum signal receiver, comprising:
a radio frequency front-end for receiving a spread spectrum signal;
a plurality of channels, each having a group of two or more adjacent correlators for correlating samples of the received spread-spectrum signal into adjacent correlation values, wherein each group of two or more adjacent correlators respectively correlate a same respective sample of the received spread-spectrum signal with a same code but shifted in time with respect to other correlators in a group such that the correlation values obtained from the adjacent correlators are spaced apart by a fraction of a time interval with respect to the same respective sample of spread-spectrum signal; and
a processor receiving the correlation values from the adjacent correlators for each channel, wherein the processor acquires the spread-spectrum signal based on a combined total power output of the adjacent correlators by searching for a maximum correlation sum among the sum of correlation values for each group instead of searching for maximum correlation values at every correlator output individually.

25. The receiver of claim 24, wherein the plurality of adjacent correlators comprise Prompt, Early and Late correlators.

26. The receiver of claim 25, wherein correlation values from the Prompt, Early and Late correlators are spaced 0.5 chip apart.

27. The receiver of claim 24, wherein the processor performs a frequency domain transform using the total power output of the adjacent correlators to determine a carrier frequency of the signal.

28. The receiver of claim 24, wherein the processor sums the total powers outputs of groups of adjacent correlators over several pseudorandom noise (PRN) sequence lengths, and uses the sum of the powers outputs to acquire the signal.

29. The receiver of claim 28, wherein the power output of each group of adjacent correlators is over one PRN sequence.

30. The receiver of claim 24, wherein the number of correlators in a group depends upon required reduction in computational load.

31. The receiver of claim 24, wherein the number of correlators in a group depends upon a required improvement in sensitivity.

32. The receiver of claim 24, wherein the number of correlators in a group depends upon input signal samples per chip.

33. The receiver of claim 27, wherein frequency domain transform is used only in a first stage.

34. A spread spectrum signal receiver, comprising:
a radio frequency front-end for receiving a spread spectrum signal;
a plurality of adjacent correlators for correlating samples of the received spread-spectrum signal into adjacent correlation values, wherein the adjacent correlators respectively correlate a same respective sample of the received spread-spectrum signal with a same code but the correlation values obtained from the adjacent correlators are spaced apart by a fraction of a time interval with respect to the same respective sample of the spread-spectrum signal; and
a processor receiving the correlation values from the adjacent correlators, wherein the processor acquires the spread-spectrum signal based on a combined total power output of the adjacent correlators, wherein the processor determines a code phase of the spread-spectrum signal by grouping adjacent correlators into groups, searching for groups having a power output above a threshold using a first code phase search step, after finding the groups having a power output above the threshold, dividing these groups into smaller groups, and searching for the code phase from among the smaller groups using a second code phase search step that is smaller than the first code phase search step.

35. The receiver of claim 34, wherein a correlation value obtained from each of the adjacent correlators is 1 ms.

* * * * *

UNITED STATES PATENT AND TRADEMARK OFFICE
CERTIFICATE OF CORRECTION

PATENT NO.        : 8,391,339 B2
APPLICATION NO.   : 11/428800
DATED             : March 5, 2013
INVENTOR(S)       : Wang et al.

It is certified that error appears in the above-identified patent and that said Letters Patent is hereby corrected as shown below:

In the Claims:

In Column 10, Line 11, delete "13:" and insert -- 13, --, therefor.

Signed and Sealed this
Fourth Day of June, 2013

Teresa Stanek Rea
*Acting Director of the United States Patent and Trademark Office*